F. L. O. WADSWORTH.
WATER HEATER CONSTRUCTION.
APPLICATION FILED JAN. 25, 1913.
1,131,021.
Patented Mar. 9, 1915.
5 SHEETS—SHEET 1.
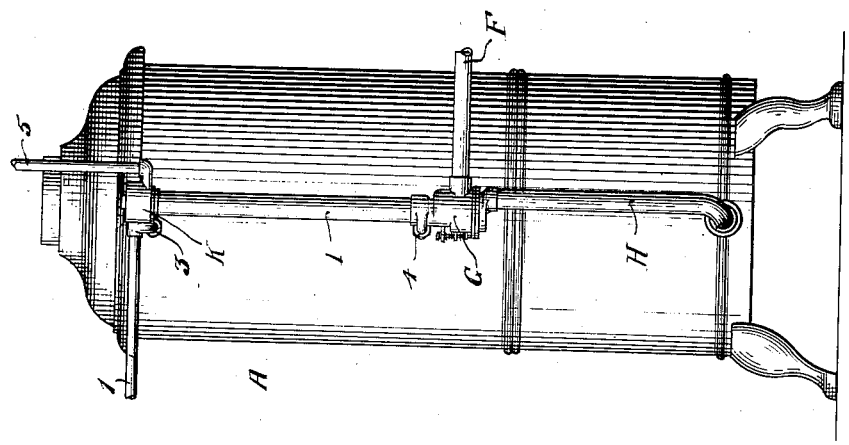
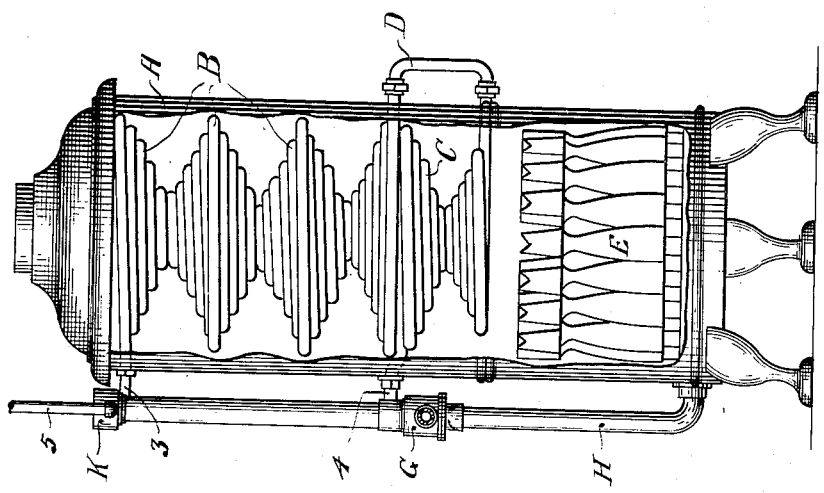
WITNESSES
INVENTOR F. L. O. WADSWORTH.
WATER HEATER CONSTRUCTION.
APPLICATION FILED JAN. 25, 1913.
1,131,021.
Patented Mar. 9, 1915.
5 SHEETS—SHEET 2.
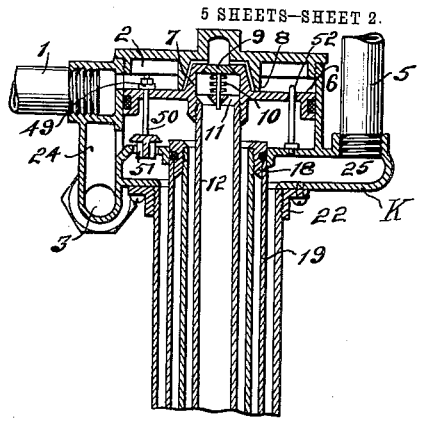
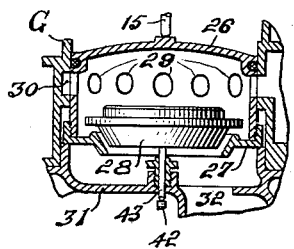
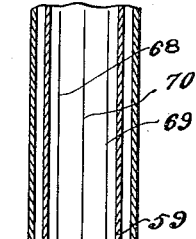
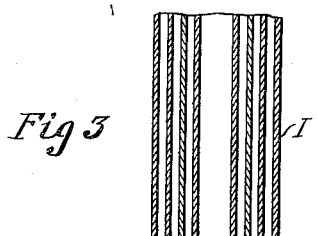
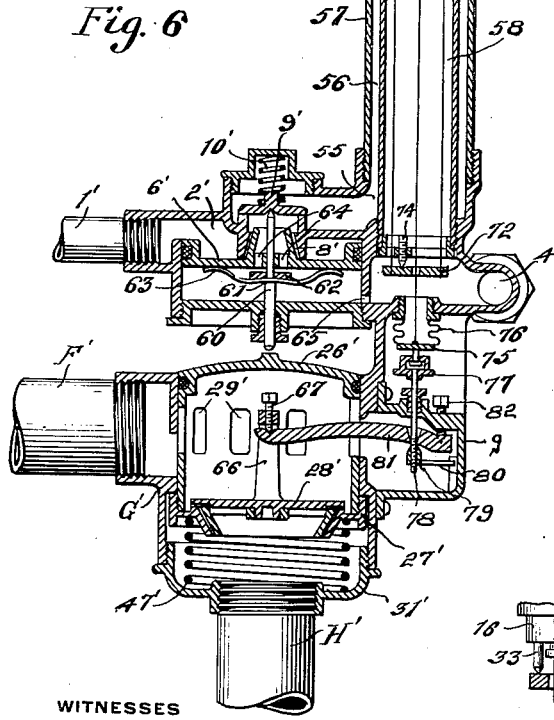
WITNESSES
INVENTOR
F. L. O. Wadsworth
by attys.

F. L. O. WADSWORTH.
WATER HEATER CONSTRUCTION.
APPLICATION FILED JAN. 25, 1913.
1,131,021.
Patented Mar. 9, 1915.
5 SHEETS—SHEET 3.
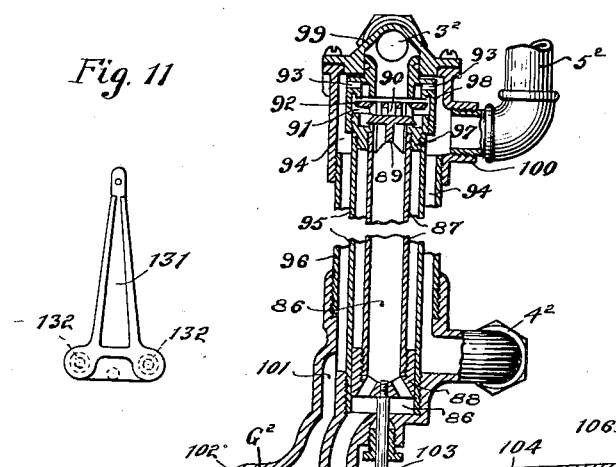
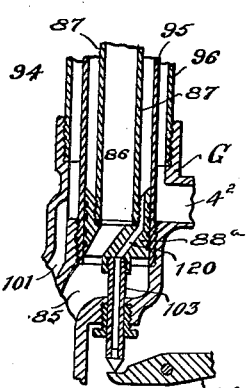
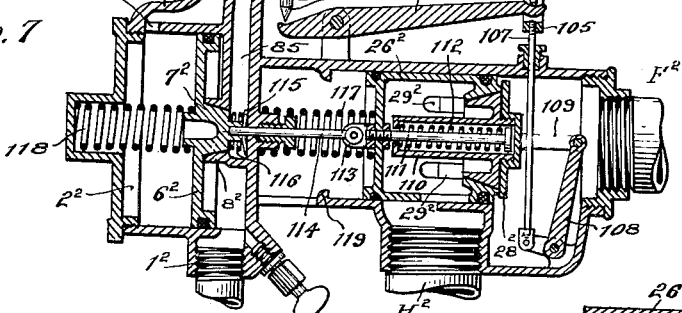
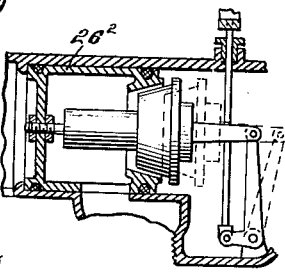
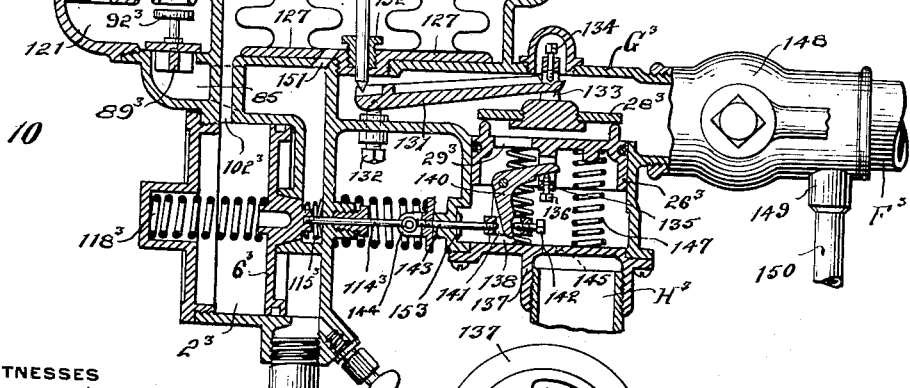
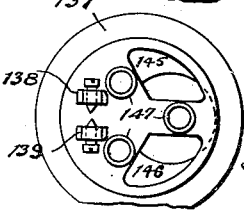
WITNESSES
INVENTOR F. L. O. WADSWORTH.
WATER HEATER CONSTRUCTION.
APPLICATION FILED JAN. 25, 1913.
1,131,021.
Patented Mar. 9, 1915.
5 SHEETS—SHEET 4.
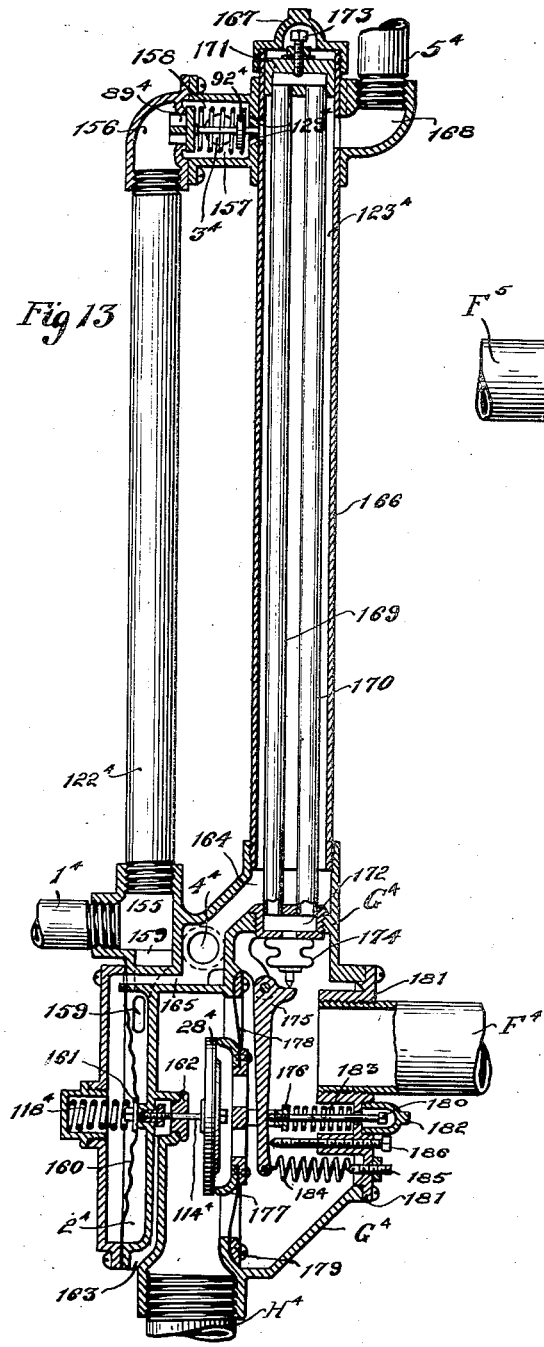
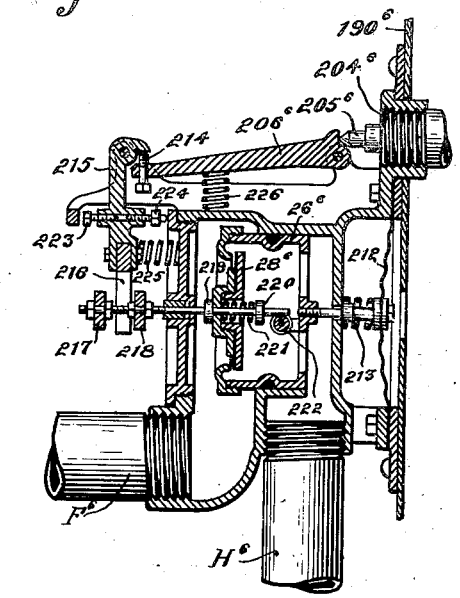
WITNESSES
INVENTOR

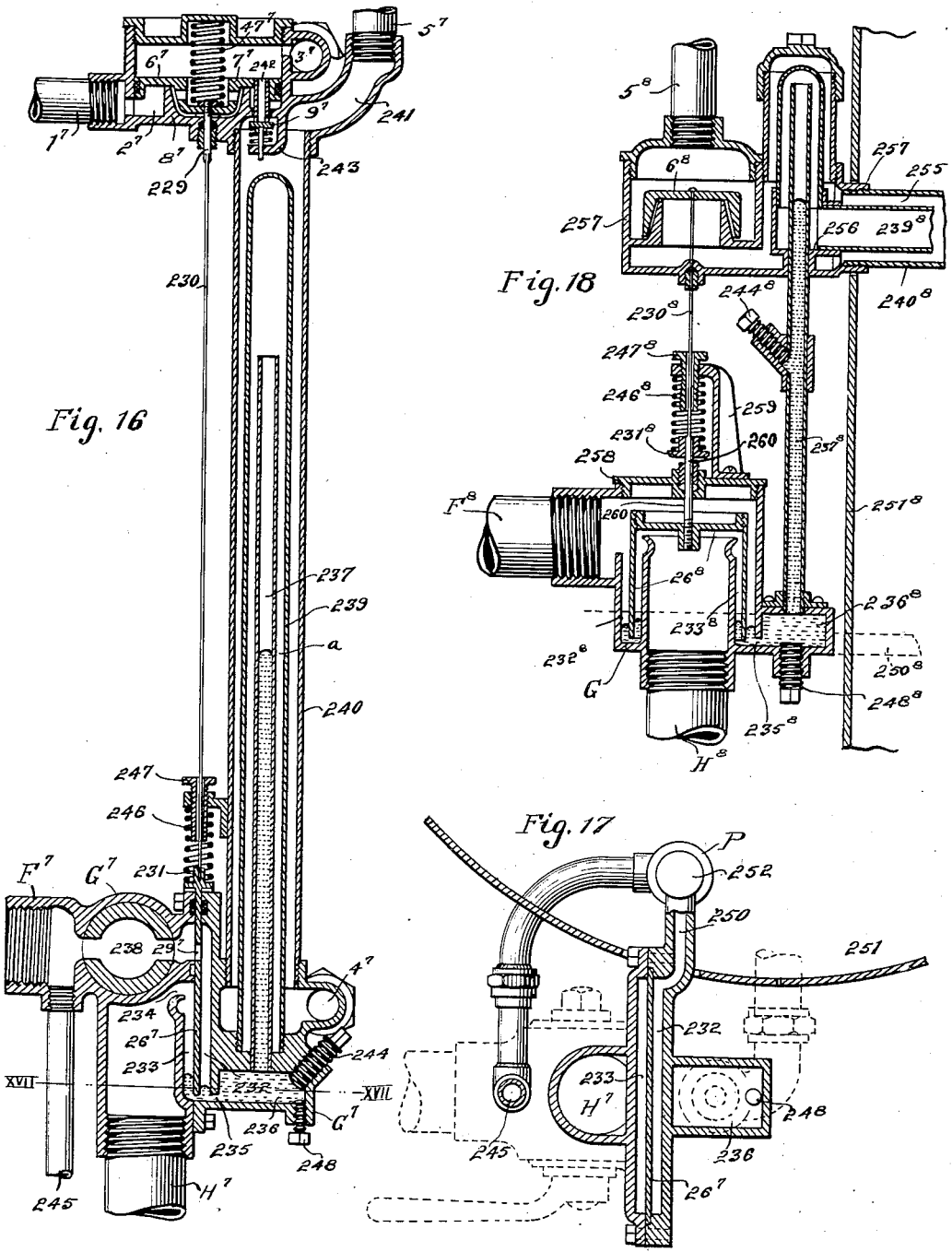
F. L. O. WADSWORTH.
WATER HEATER CONSTRUCTION.
APPLICATION FILED JAN. 25, 1913.
1,131,021. Patented Mar. 9, 1915.
5 SHEETS—SHEET 5.

UNITED STATES PATENT OFFICE.

FRANK L. O. WADSWORTH, OF SEWICKLEY, PENNSYLVANIA.

WATER-HEATER CONSTRUCTION.

1,131,021.  Specification of Letters Patent. Patented Mar. 9, 1915.

Application filed January 25, 1913. Serial No. 744,197.

*To all whom it may concern:*

Be it known that I, FRANK L. O. WADSWORTH, a citizen of the United States, residing at Sewickley, in the county of Allegheny and State of Pennsylvania, have invented certain new and useful Improvements in Water-Heater Construction, of which the following is a specification.

My invention relates to water heater construction, particularly to that type which is known as an "instantaneous" heater; but certain features of my invention may also be applied to the construction of heaters of the storage tank type. Some of the objects of my invention are:—First, to provide a construction in which the control of the fuel supply is jointly effected by water actuated elements and by thermostatically actuated elements coöperating with each other to regulate a single port or valve opening through which the gas passes to the main burners of the heater; second, to provide certain forms of improved thermostatic devices which are subject not only to the action of the hot water in the heating receptacle or hot water flowing therefrom, but also to the action of the cold liquid supplied from the water main; third, to provide improved means for automatically shutting off the connection between the cold water inlet to the heater and the water main as soon as the flow of water through the apparatus is stopped and simultaneously opening a communication between the outlet and inlet of the heating receptacle thereby establishing a path for the free circulation of the water in the receptacle under the heating influence of the pilot light or other burners; fourth, to provide a very simple and compact mechanism which can be constructed at small expense and which will be in large part contained in a single chamber or casing. Other objects and advantages of my invention will appear from a perusal of the specification, and inspection of the drawings which form a part thereof.

In the drawings Figs. 1 and 2 illustrate in side and front elevation respectively one form of heating apparatus of the so-called instantaneous type in connection with which my invention may be used. Fig. 3 illustrates in enlarged vertical cross-section the construction of control mechanism used in the apparatus of Figs. 1 and 2; Figs. 4 and 5 are detail views showing parts of the mechanism of Figs. 1, 2 and 3; Fig. 6 is a vertical cross-sectional view through a second form of control mechanism also embodying my improvements; Figs. 7 and 8 are similar views of another embodiment of my invention; Fig. 9 is a detail view of a modification of the construction shown in Fig. 7; Fig. 10 is a vertical cross-sectional elevation of still another form of my improved control mechanism; Figs. 11 and 12 are detail views of certain parts of the construction of Fig. 10; Fig. 13 illustrates in similar vertical cross-section another apparatus embodying certain features of my improvements; Figs. 14 and 15 are vertical cross-sectional views of mechanisms which embody certain features of my invention that are especially adapted for use in connection with storage tank heaters; Figs. 16 and 18 are vertical sections through other modified forms of controlling mechanisms; and Fig. 17 is a horizontal section through a structure very similar to Fig. 16, but with an addition thereto, and at about the level indicated by the line XVII—XVII.

Referring first to the general arrangement of the heater parts as shown in Figs. 1 and 2; A is the casing of the heater; B indicates the upper coils of the heater; C is the lower reverse coil connected to the upper coils by means of the pipe D; E are the gas burners mounted upon the usual burner ring; F is the gas supply pipe; G is the casing of the gas valve for controlling the supply of gas to the burners; H is the gas pipe leading from the gas valve to the ring which carries the burners E; I is the casing containing the thermostat; and K is the casing of the water actuated member for securing the operation of the gas valve when the outlet from the heater is opened and closed.

Referring now to Fig. 3 in conjunction with Figs. 1 and 2; 1 indicates the connection leading from the water main to the control apparatus, 2 indicates the cylinder containing the water actuated member into the upper end of which the pipe 1 leads, 3 indicates the water inlet leading to the top coil B of the heating receptacle, 4 indicates the water outlet leading from the lower reverse coil C of said receptacle into the bottom of the chamber containing the thermostat, and 5 indicates the hot water outlet leading from the top of said chamber to the house system. The water actuated member 6 which is located in the cylinder 2 is made in the form of a packed piston having a central perforated boss 7. which is coned exteriorly to fit loosely within a reversely coned boss 8 on the top cylinder head and is provided at its center with a check valve 9 normally held to its seat by a spring 10 interposed between the head of the check valve and a perforated disk 11 resting on the top of the pipe 12. This pipe 12 leads downwardly from the central opening in the piston member 6 and terminates near the lower end of a second pipe 13. In the lower end of the pipe 12 is secured a cap 14 which bears against the upper end of a stem 15 which passes down through a stuffing box in a second cap 16 which closes the lower end of the pipe 13. Both the lower end of the pipe 12 and the cap 14 are perforated with ports 17 through which water can pass freely from the pipe 12 into the pipe 13. The latter pipe, as already stated, is closed at its lower end with a cap 16 and is secured at its upper end to a head or collar 18 which is mounted in turn on a third pipe 19 concentric with the two inner pipes 12 and 13. The lower end of the pipe 19 is brazed to a screw collar 20 which is mounted in the upper part of the casing G which contains the gas valve and portion of the control mechanism therefor. A fourth pipe I, concentric with the three inner ones is also secured in the top portion of this same casing and extends upwardly to a screw coupling 22 on which a top casing K containing the water actuated member rests. The upper portion of the casing G is also provided with a lateral port 23 which leads to the hot water outlet 4. The top casing K is likewise provided with a port 24 which communicates at one end with the lower end of the cylinder 2, and at the other with the cold water inlet 3, and is further provided with a second port 25 which establishes communication between the upper end of the space between the two outer tubes 19 and I and the hot water outlet 5 which leads to the house supply system. As will be readily seen the construction just described is such that the water which flows past the check valve 9 into the upper end of the pipe 12 is forced to pass down through the latter, then up again through the annular space between the pipes 12 and 13, thence into the lower end of the cylinder 2 and thence through the port 24 into the cold water inlet 3. After passing through the heater coils the water emerges from the hot water outlet 4, and enters the annular space between the two outer pipes 19 and I, and passes upwardly and flows through the port 25 into the supply pipe 5. The two inner tubes 12 and 13 are made of iron, steel, Invar metal, or similar material having a low coefficient of expansion; and the two outer pipes 19 and I are made of brass, copper, or other suitable material having a high coefficient of expansion; and the two systems of pipes connected and arranged as above described constitute a composite thermostat member of which the inner element is subjected to the cooling action of the inflowing water, and of which the outer element is subjected to the separate action of the outflowing water. It will be further noted that the outer pipe 13 of the inner thermostat member, and the inner pipe 19 of the outer thermostat member are separated by a dead air space which thermally insulates the two members of the thermostat from each other. The lower end of the stem 15 abuts against the closed upper end of a hollow piston element 26 which slides vertically in the gas valve casing G and carries at its lower end a head 27 which projects inwardly to form a seat on which the gas valve 28 is normally held by gravity. The piston 26 is perforated with a series of ports 29 which afford communication between the interior of the cylinder and an external circular chamber 30 formed in the gas valve casing and communicating with the gas inlet pipe F. The lower end of the casing G is closed by a cap 31 having a side opening 32 which communicates with the gas outlet pipe H leading to the main burners of the heater. The cap 16 which forms the terminal of the inner negative thermostat element is provided with two downwardly extending studs 33 and 34 (see detail of Fig. 5) one just behind, and one just in front of the sectional plane of Fig. 3. These studs bear at their lower ends on a thermostat lever 35 which is centrally perforated to allow the passage of the stem 15 and which bears at its right hand end on a knife edge 36 supported on an extension of the side wall of the gas valve casing G. The long end of this thermostat lever 35 bears on a compression spring 37 by means of which the thermostat lever is kept in engagement with the studs 33 and 34 and knife edge 36. The outer end of said lever is also perforated to receive an end of a rod 38 which passes down through bearings in lateral extensions 39 and 40 from the wall of the gas valve casing G and bears at its lower end on the short arm of a second thermostat lever 41. The long arm of this lever 41 is provided with an adjustable screw 42, adapted to engage with the lower end of the gas valve stem 43 which passes upward through a stuffing box in the cap 31 and enters a coned recess at the center of the gas valve 28. The lever 41 is also provided with a second adjustable screw 44 adapted to engage with the lower surface of the cap 31 and thereby limit the upward movement of said thermostat lever. The rod 38 is furnished with a collar 45, and a compression spring 46 is interposed between this collar and the lug 39 in such manner as to press the rod 38 normally downward as far as the adjustable screw 44 will permit. A heavy compression spring 47 bears against the cap 27 and serves to keep the gas valve piston 26 normally in the position shown in the figure in which the top edge of the cap 27 engages with the adjacent shouldered end of the cylinder in which said piston moves. In this position the water actuated member 6 is also raised to such a position that the end of the boss 8 engages with the adjacent face of the piston member and completely closes off communication between the upper end of said cylinder and the pipe 12. In order to take care of any loss of motion which there may be—whether intentionally provided in the original design or occurring later as result of wear between the ends of the stem 15 and the members 26 and 14 with which they contact—a second compression spring 48 may be interposed between the two caps 14 and 16, but this spring may in some cases be omitted. When the piston member 6 is in its elevated position it bears against an adjustable head 49 (suitably secured by a lock nut or similar device) on the upper end of the stem 50 of a puppet valve 51, and raises the latter from its seat thereby opening the port of said puppet valve and establishing a communication between the upper end of the annular space between the two outer thermostat members and the port 24 which leads to the cold water inlet 3 of the heater coils. The opening of this port allows the water to circulate freely, under the heating influence of the pilot light or other burners, through the heater coils between the inlet 3 and the outlet 4. In order to prevent accidental rotation of the piston member 6—which might bind the parts 50 and 51—I may provide a guide stem 52, the lower end of which is secured to the bottom head of the cylinder 2, and the upper end of which passes through a hole in the piston member 6.

The operation of this control mechanism in the practical use of the heater to which it is applied is as follows: When no water is flowing through the heater—except as the result of natural circulation through the coils—the piston member 6 is in the position shown in the figure in which all communication between the supply pipe 1 and the rest of the apparatus is cut off. In this position the gas valve piston 26 is also in its highest position, and the gas valve 28 is held against its seat, both by its own weight and by the pressure of the gas on its upper side, so that no fuel can pass through the gas valve chamber into the fuel outlet pipe H which supplies the main burners of the heater. But as soon as water is withdrawn from the heating receptacle—as by opening a tap connected with the house supply line 5—the pressure on the lower side of the piston member 6 is reduced by such withdrawal of water, and the superior pressure on the top of the piston will force the latter down thereby opening the port between the reversely coned bosses 7 and 8 and allowing water to flow through this port and past the check valve 9 into the pipe 12, and thence on the path previously indicated to the inlet 3 at the top coil of the heater. The first downward movement of the piston member 6 closes the puppet valve 51, and thereby compels all water which flows out of the pipe 5 to pass from the inlet 3 through the heating coils. The downward movement of the piston 6 further depresses the gas valve piston 26 until the parts assume the position shown in Fig. 4 where the cap 27 has been brought in contact with the upper end of the cap 31. In this position the ports 29 are full open, and the gas valve 28 is raised from its seat by the engagement of the upper end of the stem 43 with the central coned recess of the gas valve head. By adjusting the screws 42 and 44 I can vary the maximum opening of the gas valve port as desired. Gas will now flow from the gas inlet pipe F through the port openings 29 and gas valve port to the gas outlet pipe H and thence on to the main burners of the heater where it will be ignited by the usual pilot light, the connections for which are not shown in this drawing. As the temperature of the flowing water rises the outer member 19 of the thermostat will expand—the inner member 13 being kept cold by the inflowing water—and the expansion of said outer member will raise the cap 16 and the studs 33 and 34 connected thereto, thereby allowing the thermostat lever 35 to be carried upward by the spring 37 until it is brought in contact with the adjustable head 53 on the upper end of the rod 38. The spring 37 is considerably stronger than the spring 46—which is made just strong enough to support the weight of the gas valve head 28—and when the thermostat lever 35 engages with the head 53 the tension of the stronger spring 37 overcomes the tension of the weaker spring 46, and thereby lifts the rod 38 allowing the long arm of the second lever 41 to fall and permitting the gas valve 28 to move downward toward its seat. As shown in Figs. 3, 4, and 6 the gas valve is provided on its lower side with a conical collar which enters a correspondingly shaped ring on the cap piece 27; and as the gas valve moves downward the approach of these two conical surfaces to each other throttles the opening between the gas valve and its seat proper thereby reducing the flow of fuel to the main burners as the point of ultimate cut off is approached. But, as shown in Fig. 3 the two conical surfaces are of such dimensions that they never engage one with the other, the final closing of the gas valve port being effected solely by the contact of the flat leather face portion of the gas valve head with its raised seat. This final contact—which determines the point at which the fuel supply to the main burners is completely cut off—can be made to take place at any desired temperature of the outflowing water by the adjustment of the nut 53. The gas valve will remain closed until the fall in temperature of the outflowing water has caused the outer member 19 of the thermostat to contract sufficiently to carry the top thermostat lever 35 out of engagement with the head 53, whereupon the rod 38 will be depressed by the action of the spring 46 thus once more raising the gas valve from its seat and admitting another supply of fuel to the main burners. These successive opening and closing movements of the gas valve will continue as long as water continues to flow and to rise above and fall below the point at which the thermostatic mechanism may be set to cut off the supply of fuel. But as soon as the flow of water is stopped the pressure on the two sides of the piston member 6 will be at once equalized, and the latter will be raised by the action of the springs 48 and 47—or by the latter alone if the former is not used—; and the resultant upward movement of the gas valve piston 26 will carry the gas valve 28 up with it and out of engagement with the thermostat mechanism so that the latter can no longer act on the gas valve until the flow of water has been again started and the gas valve piston 26 thereby depressed to the position shown in Fig. 4. If, when the flow of water is stopped the piston member 6 should for any reason be stuck in its depressed or opened position no damage could result to the heating apparatus because the thermostatic mechanism would still go on acting to shut off the supply of gas whenever the water in the coils had been raised to the point of thermostatic cut off. But the return of the piston to its normal position can be insured by the use of the check valve 9 which, as soon as the flow of water is stopped, is seated by the spring 10 and thus confines the body of liquid in the heater between said check valve and the now closed house service pipe. Any further heating of this inclosed body of liquid immediately expands it and this expansion exerts a powerful back pressure on the lower side of the piston member 6 thereby forcing the latter back to its initial position and relieving the gas valve piston 26 from all restraining downward pressure which could tend to hold it in the position of Fig. 4. Since this gas valve piston is packed as shown and may therefore be very loosely fitted in its cylinder (the gas pressure being never normally more than a few ounces at the most) there is no possibility whatever of it being stuck in this position. In this upper position shown in Fig. 3— any leakage past the piston to the fuel outlet pipe H is prevented by contact of the flanged end of the cap 27 with the engaging shoulder (which may if desired be also provided with a leather face) of the gas valve casing G.

In the construction shown in Fig. 6 the water enters the apparatus from the house main through a pipe 1', which communicates as before with the upper end of a cylinder 2' containing the water actuated member 6'. The construction of this member 6' is in general similar to that of the corresponding member shown in the construction of Fig. 3, save that it is so designed as to normally discharge the liquid which passes the water actuated member upwardly through the boss 8' to a port opening 55 directly into the outside chamber 56 of the thermostat box 57 through which it passes upwardly to an opening 24' which communicates with the water inlet 3' leading to the top coil B of the heating receptacle. After passing through said receptacle the water emerges from the lower outlet opening 4' communicating with the lower reverse coil C of the heater, and enters the lower end of the inner thermostat chamber 58, and passes upward through the latter to the pipe 5' which communicates with the house supply system. In this case both the pipe 57 which forms the outer wall of the thermostat box and the pipe 59 which divides said box into the outer and inner chambers 56 and 58 are made of iron, steel, or some other suitable material having a very low coefficient of expansion, and the inner wall of the pipe 59 is preferably coated with an elastic or semi-elastic heat insulating enamel (such for example as that commonly used for metal electrical conduits), which will not be affected by the action of hot water or by the slight expansion and contraction of the tube. The opening between the upper end of the central boss of the water actuated member 6' and the passage way 55 is provided with a check valve 9' which is pressed downward by a weak spring 10', but in the top closed position of the water actuated member this check valve is held slightly away from its seat by the upper end of the stem 60 which passes down through a stuffing box in the lower head of the cylinder 2' and engages with a central boss on the gas valve piston 26'. This stem 60 is not directly secured to the piston member 6' but is provided with a shoulder 61 which supports a valve seat 62 and a leaf spring 63, the outer ends of which bear against the lower side of said piston member, and serve to keep it normally slightly raised away from the valve seat 62 and against the seat of the boss 8'. The lower end of the central boss of this water actuated member is provided with ports 64, and another port 65 leads from the lower end of the cylinder 2' to the lower end of the inner thermostat chamber 58. When the piston member 6' is in the position shown in the figure the ports 64 are open, and allow the water in the apparatus to pass freely from the inner thermostat chamber 58 to the outer thermostat chamber 56 and to circulate freely through the heating coils between the outlet 4' and the inlet 3' of said coils. The gas valve piston 26' and the gas valve 28' cooperating therewith are of the same general construction as shown in Fig. 3, save that the latter member is provided with an upwardly extending fork 66 and an adjustable screw 67 whereby it is connected to and actuated by a thermostatic control mechanism. The thermostat member which I use in this construction is of a novel character and consists of a series of wires, tapes, or very thin rods 68, 69, and 70 connected by top and bottom levers 71 and 72 which are pivotally supported on knife edge screws 73 and 74 mounted in caps secured to the ends of the tube 59. The upper end of the first wire or rod 68 is likewise secured to the upper cap of the tube 59 and the lower end of the wire 70 is secured to a plate 75 which forms the end member of a corrugated diaphragm box 76 the interior of which is in free communication with the liquid in the inner thermostat chamber 58. It is readily seen that the expansions of the three wires or bars 68, 69, and 70 will, when mounted in this manner be cumulative in effect, and that these three expansible members will be kept constantly under tension by the pressure of the liquid acting on the elastic diaphragm box 76. The plate 75 is provided with a downwardly projecting button head which engages with the slotted fork 77 secured to the upper end of the stem 78 which passes down through a stuffing box in the top wall of a lateral extension $g$ of the gas valve casing G'. At the lower end this stem 78 is provided with a nut 79 which is prevented from rotation by a pin 80 engaging with a slot in the wall of the chamber $g$. This nut 79 bears against a thermostat lever 81 which is supported at its right hand end on adjustable screws 82 (one just back of, and one just in front of sectional plane of the drawing) and engages at its left hand end with the screw 67 already described.

The operation of this mechanism is very similar to that of Figs. 1, 2, and 3. When no water is flowing through the heater the parts are in position shown in the figure, the water actuated member 6' being raised against the end of the boss 8', and the gas valve piston 26' being correspondingly raised to the highest position to which it is permitted to move by the engagement of the cap 27' with the adjacent shoulder of the gas valve casing G. The parts are held in this position by the joint action of the coil spring 47' and the leaf springs 63. In this position the screw 67 is out of engagement with the end of the thermostat lever 81, the parts being so adjusted that no contact between these parts can take place at the very lowest temperature to which the water in the thermostat chamber may fall. When a flow of water is started through the apparatus by withdrawing the liquid from the house service pipe 5' the pressure on the lower side of the piston member 6' is reduced by such withdrawal of water—through the port 65—and the piston member will immediately be depressed by the superior pressure of the inflowing water on the top of it. The first downward movement of the piston closes the port openings 64—the leaf spring 63 being weaker than the coil spring 47'—and simultaneously opens the ports around the central boss of said member thereby admitting water to the outer chamber 56 of the thermostat box and to the inlet 3' of the heater coils communicating therewith. The piston will continue to be depressed under the pressure of the flowing water on its top side—this movement being aided as in the previous construction by the withdrawal of water from its under side—and will carry down with it the gas valve piston 26', said movement continuing until the cap 27' has been brought into contact with the upwardly projecting flange of the cap 31'. The gas valve head 28' follows the downward movement of the gas valve piston 26' until the screw 67 engages with the end of the thermostat lever 81, whereupon the further motion of said gas valve 28' is arrested, and the gas valve port is opened by the further downward movement of the gas valve piston. The maximum opening of this valve can be determined as before by the adjustment of the parts, but in this case it must be such as to nearly correspond to the maximum movement of the gas valve under the extreme ranges of temperature to which the water in the heater coils is subjected. The lifting of the gas valve from its seat in the manner above described allows fuel to flow from the pipe F' through the ports 29' and the gas valve port opening into the supply pipe H' which leads to the main burners of the heater, where the gas is ignited by the usual pilot light. As the temperature of the water flowing from the outlet of the heating receptacle through the inner thermostat chamber 58 rises, the wires or bars 68, 69, and 70 expand, and allow the head 75 to be moved downward by the pressure of the liquid. The downward movement of the head 75 permits the downward movement in turn of the stem 78 thus allowing the gas valve head 28' to move toward its seat and ultimately close the gas valve port at a predetermined temperature which may be varied by the adjustment of the screws 82, and more conveniently by turning the forked head 77 and thereby moving the nut 79 up or down. The gas valve 28' is thus closed, the fuel supply is shut off from the main burners and the temperature of the flowing water immediately begins to fall. This contracts the parts 68, 69, and 70, raises the head 75 and with it the stem 78, the lever 81 and the gas valve 28', and admits a fresh supply of fuel to the heating burners. As before, these opening and closing movements of the gas valve will continue as the temperature of the flowing water falls below and rises above the cut off point; but as soon as the flow of water is stopped the pressure on the two sides of the piston member 6' will become equalized and the gas valve piston 26' will be raised to its initially described position thereby carrying the gas valve 28' out of engagement with the thermostatically controlled mechanism and the gas valve will be then kept seated both by its own weight and by the pressure of the gas on its upper side. The final movement of the water actuated member 6' to its closed position—as shown in Fig. 6— is effected by the leaf spring 63, and in this position, as already explained, means are provided for the free circulation of water between the inner and outer thermostat chambers and through the heating coils which are connected at top and bottom of said outer and inner chambers. If the piston member 6' should stick in its open position, and thereby prevent the spring 47' from returning the gas valve piston 26' to its upper position no damage could result to the heater, because under such circumstances the thermostatic mechanism would go on acting just as it did when the water was flowing, and shut off the gas whenever the temperature of the liquid in the thermostat chamber had exceeded the point of thermostatic cut off. But in this case as before I insure the positive return of the piston member 6' to its closed position by providing the automatically acting check valve 9' which, when the piston is depressed, will immediately close against the upper end of the boss 8' on the cessation of the flow of water, and will thus confine the body of liquid in the heater between it and the now closed house service pipe. The heating of this inclosed body of water will necessarily expand it and this expansion will produce a pressure on the lower side of the piston (the ports 64 now being closed by the seating of the valve 62) thus immediately raising it far enough to relieve the gas valve piston 26' from all pressure of the stem 60 and leaving said piston free to be returned to its top position by the tension of the strong compression spring 47'. This upward movement of the gas valve piston and of the stem 60 will at the end open the check valve 9' and thereby equalize the pressures on the two sides of the piston member preventing any accident which might occur from too long continued pressure of the expanding water on the lower side of the said piston.

In the construction shown in Fig. 7 a somewhat different arrangement of parts is illustrated. In this case the axis of the water actuated member and of the gas valve parts moved thereby is horizontal and at right angles to the axis of the vertically arranged thermostat chamber. This is the disposition of parts which is commonly found in present types of instantaneous hot water heaters. The liquid from the water main is led to the apparatus through a pipe $1^2$ that enters the front end of the cylinder $2^2$, this cylinder containing the water actuated member $6^2$ of the same general construction as that shown in Figs. 3 and 6. A passage way 85 leads from the port openings around the central boss $8^2$ of the cylinder member to the lower end of an inner thermostat chamber 86. This chamber contains the negative tubular thermostat chamber element 87 which is composed of iron, steel, Invar metal or similar suitable material. The lower end of this element is closed by a perforated cap 88 through which the water flows from the passage way 85 to the interior of the tube 87 and thence flows upwardly to the inlet $3^2$ leading to the top coil of the heating receptacle. The upper end of the tube 87 is closed by a gravity acting check valve 89 which is provided with a series of ports 90, which, when the check valve is raised will allow the water to flow from the chamber 91 containing said check valve on into the chamber from which the water inlet $3^2$ leads. This check valve 89 is also provided with an upper head 92, which, when the check valve is raised to permit the passage of water to the inlet pipe $3^2$, is seated against the faces of the ports 93 leading from the chamber above the check valve to the outer chamber 94 of the thermostat box. This outer chamber is formed by an inner tube 95 of brass, copper or other similar material having a high coefficient of expansion, and constituting the positive element of the thermostat member, and an outer tube 96 which may either be of the same material as the inner tube or may be of iron. The inner tube 95 is secured at its lower end in the casing $G^2$ (which, in this case, contains both the water actuated element and the gas valve parts,) and is secured at its upper end both to the cap 97 which connects the upper ends of the inner and outer thermostat parts 95 and 87, and also to the cap 98 which contains the check valve 89 and the ports 93. The upper end of the cap 98 is machined and fitted within the head 99 and this is secured in turn to the terminal fitting 100 which closes the upper end of the outer tube 96, and contains a branch which leads to the house service pipe $5^2$. The lower end of the tube 96, like the tube 95 is secured in the top part of the casing G, and a branch leads from the part of the casing just below the end of the tube 96 to the water outlet $4^2$ from the lower reverse heater coil. A second branch 101 leads from the lower end of the outer thermostat chamber 96 to a port 102 which opens into the left hand end of the cylinder $2^2$. The cap 88 which is secured to the lower end of the inner thermostat member 87 is machined on its outer surface and neatly fitted in the lower end of the tube 95 which constitutes the positive member of the thermostat, so that these two tubes may be free to expand or contract differentially under the heating and cooling influence of the hot water passing up through the outer thermostat chamber and the cold water passing up through the central thermostat chamber. There will in the course of time be some leakage of water through the sliding joint between the cap 88 and the tube 95, and thus water will gradually fill the space between the tubes 87 and 95. This does no harm for the reason that the water in this space cannot circulate, but forms simply a dead layer which acts in some respects like an insulating sheet between the two tubular elements of the thermostat. The temperature of the inner element will always be practically that of the cold inflowing water, while the temperature of the outer element will be that of the hot outflowing water. To the cap 88 is secured a stem 103 which passes down through a stuffing box in the wall of the casing G and terminates in a knife edge opposite the short arm of a thermostat lever 104. The long arm of this thermostat lever enters a fork 105 carrying an adjustable screw 106, and this fork is secured to the upper end of the stem 107 which passes down through a stuffing box and is pivotally engaged at its lower end with the short arm of the second thermostat lever 108. The lever 108 is of a bell crank form, and its long arm is pivotally connected to a fork 109 extending out from the back of the gas valve $28^2$. This gas valve, like the ones shown in the constructions already described, is made in two parts between which the leather washer which forms the seat of the valve is held. In this construction the inner part is provided with a long hollow boss 110 which surrounds a stud or stem 111 that is secured to the front head of the gas valve piston $26^2$. Interposed between the end of the boss 110 and the head of the stud 111 is a compression spring 112 which serves to pull the two parts toward each other and normally keep the valve $28^2$ against its seat on the right hand end of the piston member $26^2$.

This piston member is provided with a series of ports $29^2$ which open from the interior of the gas valve piston into an encircling chamber in the casing surrounding said piston, and this chamber is connected with the gas outlet pipe $H^2$ which leads to the main burners of the heater. A fork 113 is secured to the front head of the gas valve piston $26^2$ and a stem 114 leads from this fork through a stuffing box in the front head of the water cylinder $2^2$, and is secured in the central boss $7^2$ of the piston member $6^2$. A leather washer 115 is secured to the end of this boss adjacent to the front cylinder head and is held against said head at its outer end (when the piston is in position shown in the figure) by means of a light compression spring 116, thereby sealing the opening around the stem 114 and preventing any leakage of water at the point even when the stuffing box is quite loose. Two compression springs 117 and 118, one of which is interposed between the adjacent opposing ends of the gas valve piston $26^2$ and the head of the cylinder $2^2$, and the other of which is interposed between the piston $6^2$ and the rear head of the cylinder $2^2$, serve to keep said gas valve piston member and said water actuated member normally in the position shown in the figure.

The operation of this mechanism is readily understood from the description of the operations of the constructions already described. When no water is flowing the piston member $6^2$ is held against the end of the boss $8^2$, and in this position no water can flow from the pipe $1^2$ into the apparatus. But as soon as a tap in the house service pipe $5^2$ is opened water is withdrawn from the outer thermostat chamber 94, and also withdrawn from the back of the piston member through the port 102. This withdrawal of water sets up a difference in pressure between the two sides of the piston member and the latter is moved to the left opening the ports around the central bosses $7^2$ and $8^2$, and allowing water to flow through the passage way 85 to the central thermostat chamber 86 and thence through the port openings in the check valve 89 to the water inlet $3^2$ of the heater coils. The flow of water past this check valve 89 lifts the latter and closes the port openings 93 thereby compelling all of the liquid which passes out through the pipe $5^2$ to flow through the heater coils. The movement of the piston $6^2$ to the left pulls the gas valve piston $26^2$ over against the shoulder 119, as shown in the detail of Fig. 8. The gas valve $28^2$ will follow the motion of the gas piston until the thermostat lever 104 has been brought in contact with the knife edge on the stem 103, and will then stop. If the temperature of the water flowing through the outer thermostat chamber 94 is less than that for which the thermostat is set to cut off the fuel supply the main gas valve port between the gas valve 28² and its seat on the piston member 26² will be opened allowing fuel to flow from the gas inlet pipe F² to the gas outlet pipe H² and thence to the main burners of the heater where it is ignited as before by the usual pilot or other means provided for that purpose. As the temperature of the flowing water rises the outer thermostat member 95 will expand raising the stem 103 and allowing the gas valve 28² to move toward its seat until it finally closes the main gas valve port and shuts off the fuel supply to the heating burners. The point of final cut-off is determined by the adjustment of the screw 106, and is always effected by the contact of the flat disk portion of the gas valve 28² with the seat on the right hand end of the gas valve piston 26². The inner coned part of this gas valve is provided only for the purpose previously indicated, viz., to throttle the main gas valve opening prior to its complete closure, thereby more effectually regulating the flow of gas to the main burners of the heater than can be done by the movement of a perfectly flat gas valve. When the supply of fuel to the main burners is cut off the temperature of the flowing water at once begins to fall, and the outer thermostat member 95 begins to correspondingly contract, thus depressing the stem 103, raising the long arm of the thermostat lever 104, and correspondingly moving the gas valve 28² to the right away from its seat. This admits a fresh supply of fuel to the main burners. These opening and closing movements of the gas valve will continue as the temperature of the flowing water falls and rises below and above the point of thermostatic cut off, the gas valve piston 26² being held constantly in a fixed position against the shoulder 119 by the differential pressure set up by the flowing water on the two sides of the piston member 6². As soon however as the flow of water stops this differential pressure disappears, and the piston members 6² and 26² are returned to their initial positions by the action of the springs 117 and 118. In the initial position the gas valve is, as already explained, always closed, the range of movement being so proportioned that in said position the thermostat lever 104 is out of contact with the stem 103 at the very lowest temperature that can be assumed by the water in the apparatus. When the water flow stops the check valve 89 immediately returns to its seat thereby opening the ports 93 and allowing the water to pass freely from the outer thermostat chamber to the inlet 3² of the water heater, thus establishing a circulation for the liquid through the outer thermostat chamber and the heater coils, between the inlet and outlet openings 3² and 4². This return of the check valve to its seat also confines the liquid in the heater between said check valve and the now closed house service pipe, and if the piston member 6² should stick in its opened position it will be immediately forced back to its seat by any further heating of said inclosed body of liquid in the manner already described in the previous cases.

In Fig. 9 I have shown a slight modification of thermostat construction which is illustrated in Fig. 7. In this case the cap 88ª which is secured to the lower end of the inner tubular thermostat member 87 is provided with a drainage port 120 which leads from the space between the inner thermostat element 87 and the outer thermostat element 95 down through the stem 103 to the outside of the casing. This port will drain away any water that leaks through the joint between the cap 88ª and the tube 95 and thus keep the space between the inner and outer thermostat elements always open. In this way I preserve always an air insulating layer between these two elements thereby preventing very completely any reciprocal heating or cooling effect of the two streams of hot and cold water passing through the outer and inner thermostat chambers 86 and 94.

In this construction shown in Figs. 10, 11, and 12 the water piston and water actuated member contained therein are of precisely the same construction as is illustrated in the construction of Fig. 7. This part of the apparatus therefore requires no further description. In this case however the cold water which enters the passage way 85 does not flow through any part of the chamber containing the thermostat member but passes directly into a chamber 121 containing a check valve 89³, and thence to a pipe 122 which leads to the cold water inlet communicating with the top coil of the heater. After passing through the heater coils the water emerges from the outlet 4³ and enters the chamber 123 which contains the thermostat member. The thermostat member which I use in this case is of the liquid actuated type and comprises two concentric corrugated shells or cylinders 124 and 125 closed at their tops and bottoms by plates 126 and 127, the space between said corrugated cylinders being filled with suitable liquid having a high coefficient of expansion, or with paraffin or some eutectic alloy which melts at a temperature less than that for which the thermostat is designed to act. After passing through the thermostat chamber 123 the hot water emerges therefrom through a port 128 and enters the lower end of a pipe 5³ which communicates with the house supply system. A second port 129 leads from the outlet of the thermostat chamber to the port 121 in which the check valve 89³ is located, and the said check valve is provided with an upper head 92³ which, when the check valve is raised to allow the water to flow from the passage way 85 to the chamber 121, closes the port opening 129. A third port 102³ leads from the thermostat chamber through a core piece in the passage way 85 into the left hand end of the cylinder 2³. The upper plate 126 of the thermostat member is connected to a stem 130 which passes down through the lower plate 127 and the part of the gas valve casing G³ which supports said plate and forms the lower wall of the thermostat chamber 123. This stem terminates in a knife edge which bears on the short arm of a thermostat lever 131, this thermostat lever being supported on two pivot point screws 132, one of which is just in front, and the other just behind the sectional plane of the drawing (see detail of plan view of this thermostat lever in Fig. 11). The long arm of the thermostat lever enters a fork 133 secured to the upper face of the gas valve 28³, and carries in its upper cross-bar an adjustable screw 134. The gas valve which I use in this case is not provided with any conical surface such as is shown in the constructions of Figs. 3, 6 and 7 but has a perfectly flat lower face which is adapted to engage with an upwardly projecting ring-seat on the top of the gas valve piston 26³. This gas valve piston is somewhat different in form from any of those previously described, being provided with a middle cross-wall having a central downwardly projecting fork 135 the lower cross-arm of which carries an adjustable screw 136. The part of the gas valve casing G³ which forms the bearing for this piston is closed at its lower end by a cap plate 137, a plan view of which is shown in Fig. 12. The cap plate is provided with two upwardly projecting lugs 138 and 139 which are threaded at their upper ends to receive pivot point screws between which is a mounted bell crank lever 140. The upper arm of this lever enters the fork 135 and engages with the screw 136, and the lower arm enters this stirrup 141 and engages with a second adjustable screw 142 in the outer cross-arm of this stirrup. The inner end of said stirrup is secured to a stem 143 which passes out through the side wall of the gas valve chamber and terminates in a fork 144 to which is secured the end of the stem 114³ which leads to the water actuated member 6³, and is connected thereto in the same way as in the construction of Fig. 7. The middle plate of the gas valve piston is provided with three ports 29³ at 120 degree intervals, and the lower cap 137 is likewise provided with two corresponding ports 145 and 146 and interposed between the ribs surrounding these ports on the two parts just mentioned are three compression springs 147 which serve to keep the piston 26³ normally elevated to the position shown in the figure in which the fork 144 is in contact with the adjacent face of the gas valve casing G, and the washer 115³ is also in contact with the front wall of the water cylinder 2³. The cap 137 is provided with a downwardly projecting boss which is threaded to receive the gas outlet pipe H³ which communicates with the main burners, and the adjacent side wall of the gas valve chamber is threaded to receive one end of a plug valve casing 148 interposed between the casing and the gas inlet pipe F³. This plug valve casing is provided with a lateral branch connection 149 from which a tube 150 leads to the usual pilot light. It may be stated in this connection that a similar plug valve would ordinarily be used between the gas inlet pipe F and the gas valve casing G in all of the constructions previously described; but as such an arrangement is ordinarily used in all water heater constructions of this type it is not specifically illustrated and described in each case.

The operation of this apparatus in regulating the supply of gas to the main burners of the heater differs in no essential respect from that of the previously described mechanisms, although the flow of water through the apparatus follows a somewhat different path, and the relative arrangement of parts is also different from those used in the constructions of Figs. 3 to 9. The mechanism now being considered also differs from those of the above mentioned figures in that no part or element of the thermostat member is subjected to the action of the cold inflowing water. The inner tube 125 of the thermostat may, if desired, be exposed to the action of the cold water in the chamber 85 by providing a port 151 and a stuffing box 152 surrounding the lower end of the stem 130. As the use of this port 151 is in this case optional it is indicated merely by dotted lines. If the port 151 is opened, and cold water is thus allowed to come in contact with the inner tube 125 of the thermostat member the action of such water will be similar to that of the action of the inflowing water on the thermostatic construction shown in Fig. 7, viz., it will reduce the temperature of the positively acting member of the thermostat (in this case the liquid) somewhat below that which it would have if acted on by the hot water alone, and this reduction in temperature will be proportional to the temperature of the liquid supplied from the water main. In consequence of this the expansion of the positive member of the thermostat under the influence of the hot outflowing water will decrease somewhat as the temperature of the inflowing water falls. In consequence of this the temperature of the outflowing hot water at which the point of thermostatic cut-off will be reached will not remain constant, but will be automatically increased as the temperature of the cold inflowing water is decreased. Hence in any given setting of the thermsotatic mechanism the temperature of the hot water supplied by the heater will be automatically raised as the temperature of the water in the supply main falls, and water will therefore be hotter in the winter than it is in summer. This is a result which is in any case very desirable of attainment. On the other hand with the mechanisms illustrated in Figs. 3, 6 and 9, in which the negative element alone of the thermostat is exposed to the action of the cold inflowing water—the positive element being protected against such action either by a thermally insulating layer of enamel and intervening current of hot water or by a heat insulating sheath of air—the effect of the fall in temperature of the cold inflowing water on the thermostatic control mechanism, is the same as the effect of a rise in temperature of the hot out-flowing water on that mechanism. Hence with the mechanism of the constructions just referred to a decrease in the temperature of the liquid supplied from the water main will result in the point of thermostatic cut off being reached at a lower temperature of the outflowing water. In such cases therefore, with a given setting of the thermostat parts, the water will be heated less in winter than it is in summer. This is also a desirable result in some cases, since it maintains the capacity of the heater at different times of the year at more nearly the same value.

Referring now briefly to the operation of the construction illustrated in Figs. 10, 11 and 12 it will be noted that as soon as the water is turned on the water actuated piston member will be moved to the left admitting water to the chamber 85, and lifting the check valve 89³—thereby closing the port opening 129. The water will flow past the check valve into the chamber 121 and pipe 122 to the inlet of the heater coils, pass through these heater coils, emerge from the outlet 4³, flow through the thermostat chamber 123, and out through the port 128 into the house service pipe 5³. The movement of the piston member 6³ to the left carries with it the stem 114³ and the stem 143 connected thereto and operates the bell crank lever 140 to draw down the piston member 26³. The downward movement of this piston member is arrested by the engagement of the stirrup member 141 with the leather washer 153, said engagement serving to simultaneously seal the opening around the stem 143 against the escape of gas which flows into the lower part of the gas valve casing. As the gas valve piston 26³ moves downward the gas valve 28³ will follow it until the short arm of the thermostat lever 131 makes contact with the knife edge on the end of the stem 130. If the temperature of the flowing water is less than that for which the mechanism may be set to cut off the flow of gas, this contact will take place before the gas valve has followed the piston all the way down, and a port opening between the parts 26³ and 28³ will be left through which fuel will pass from the gas supply pipe F³ through the ports 145 and 146 (Fig. 12) to the gas outlet pipe H³ which leads to the main burners, and fuel will be ignited thereat by the flame of the pilot light constantly supplied with fuel through the connection 149 and pilot light tube 150. The flowing water will be immediately raised in temperature by the heat of the main burners and as it rises in temperature it will expand the liquid in the thermostat and raise the stem 130, allowing the gas valve 28³ to move further downward, and finally seat itself on the gas valve piston head in the lowermost position of the latter. This will cut off the supply of fuel to the main burners, and this point of final thermostatic cut-off may be varied by adjusting the screw 134, access to which can be obtained by removing the cap provided for that purpose. When the temperature of the flowing water falls the liquid in the thermostat will contract, and the thermostat member and stem 130 will be forced downward by the pressure of the water in the thermostat chamber (this will occur even when the space within the inner tube is filled with water because the cross-sectional area of the outer tube 124 is greater than that of the inner tube 125), and this will depress the short arm of the thermostat lever 131 and raise the gas valve away from its seat, thus once more admitting a fresh supply of fuel to the main burners. These regulating and controlling movements of the gas valve will continue with the rise and fall of temperature of the water as long as it continues to flow through the heater; but as soon as the flow of water is stopped the water actuated member is returned to its initial position by the action of the spring 118³ supplemented by the action of the springs 147, these latter springs also serving to raise the gas valve piston 26³ to its highest position, in which position the gas valve 28³ is beyond the reach of any controlling action exerted by the thermostat parts, and is kept closed by gravity. If the water piston, or for that matter the gas valve piston, should stick in the opened position, both of these parts will be forced back to their closed positions by the expansion of the confined body of liquid in the heater (inclosed between the said check 89³ and the now closed house service pipe), in the same manner as previously described.

The construction shown in Fig. 13 differs from those already described principally in having the gas valve head moved by the water actuated element, and in having the part which corresponds to the gas valve piston controlled by the movement of the thermostatic mechanism. It also differs from the previous constructions in certain details of construction presently to be described. Liquid passes into the apparatus from the water main through the pipe $1^4$ and enters a chamber 155, and thence to a pipe $122^4$ which leads to an elbow connection 156 near the top of the heater shell. This elbow connection communicates with a second chamber 157 containing a check valve $89^4$ of the same general construction as that illustrated in Fig. 10 and provided with a branch opening leading to the cold water inlet $3^4$ of the top coil of the heating receptacle. The chamber 157 is also provided with port openings $129^4$ leading into the upper end of the thermostat chamber $123^4$. The check valve $89^4$ is provided with a second head $92^4$ which is adapted to close the port openings $129^4$, and the check valve is normally held in the position shown in the figure—in which the opening between the chambers 156 and 157 is closed and the ports $129^4$ are open—by a light compression spring 158. The chamber 155 is further provided with a port 159 which leads downwardly into the right hand end of the chamber $2^4$ which contains the water actuated element, the latter being in this case a flexible metal diaphragm 160, provided at its center with a metal ring or washer 161, which is faced with leather and normally held against the adjacent face of an inwardly turned boss on the right hand head of the chamber $2^4$ by a compression spring $118^4$. A stem $114^4$ is secured to the washer 161, passes through a stuffing box and a cap 162 in the right hand head of the water chamber $2^4$, and is secured at its other end to the gas valve head $28^4$. The space between the stuffing box and the cap 162 is provided with a cored passage way 163 which leads from this space to the outside of the casing $G^4$—which in this case also contains both the gas valve parts and the water actuated parts—so that any water which leaks through the stuffing box, when the leather faced washer 161 is withdrawn from the boss against which it rests, is carried away to the outside of the apparatus. The water after passing through the heater coils emerges from the outlet $4^4$ and enters a chamber which has two ports, one, 164 leading to the bottom of the thermostat chamber $123^4$ and the other, 165, leading to the left hand end of the water chamber $2^4$. The thermostat chamber is formed in this case of a single tube 166 which is secured at the bottom in the gas valve casing $G^4$ and at the top in the casing of the chamber 157 and is closed at its upper end by a detachable cap 167. A branch connection 168 leads from the upper end of the thermostat chamber to the pipe $5^4$ of the house supply system. The thermostat member which is placed in the tube 166 consists in this case of a nest of iron, steel, or Invar metal pipes 169 and 170 which are brazed at both their top and bottom ends into hollow caps 171 and 172. The first cap 171 is fitted neatly in the upper end of the tube 166 and is provided with a screw 173, access to which can be obtained by removing a cap 167. The second cap 172 is screwed into the top portion of the gas valve casing $G^4$ and is provided on its lower side with a corrugated metal diaphragm or box 174 the lower end of which terminates in a knife edge that bears on the short arm of the thermostat lever 175. The closed space in the interior of the tubes 169 and 170, caps 171 and 172, and corrugated box 174 is filled with some suitable liquid having a high coefficient of expansion, or with paraffin or an eutectic alloy which melts at a temperature less than that at which the thermostat is desired to act, the volume of this inclosed space being capable of adjustment by means of the screw 173. The thermostat lever 175 is mounted on pivot point screws secured in lugs projecting from the side of the gas valve casing $G^4$, and the long arm of said lever passes through a fork or stirrup 176 on the back of the member which carries the gas valve seat 177. This gas valve seat is supported by an annular ring 178 of thin flexible leather or other suitable gas tight material, the inner periphery of which is clamped between the gas valve seat 177 and the stirrup plate 176, the outer periphery being clamped between the gas valve casing $G^4$ and a ring 179 which may be made in three or more segmental sections for convenience of insertion. The stirrup 176 carries an adjustable screw 180 which extends through the plate 181 closing the right hand end of the gas valve casing G and is covered by a cap 182. A compression spring 183 is interposed between the stirrup 176 and the cap 181 and serves to keep said seat 177 normally closed against the gas valve head $28^4$. The long end of the thermostat lever is extended down through the stirrup piece 176 and is connected at its lower end to a tension spring 184 the other end of which is adjustably secured to the cap 181 by means of a bolt 185. An adjustable screw 186 is threaded through the plate 181 midway between the cap 182 and the bolt 185 and serves to limit the motion of the thermostat lever 175 under the action of the tension spring 184.

The operation of the mechanism shown in the last described figure will be readily understood, since it is, in all general respects, the same as that of the various other forms of mechanism illustrated in the earlier figures. When no water is flowing through the apparatus the pressures on the two sides of the diaphragm 160 will be substantially the same, and the diaphragm is held in the position shown in the figure by the spring 118⁴, which, in conjunction with the spring 183, holds the gas valve head and its seat in closed relation with respect to each other, and prevents any fuel flowing from the right hand side of the gas valve casing G to the left hand side; the screw 186 being so adjusted that in this position of the parts the thermostat lever is prevented from engaging with the screw 180. When a flow of water is established—as by opening the tap in the house service pipe 5⁴—a difference in pressures is established on the two sides of the diaphragm member 160 (which are exposed respectively to the pressure of the water in the inlet chamber 155 and the outlet passage 164) by the resistance to the flow of the liquid through the heater coils. Under this difference in pressure the diaphragm member will be moved to the left until the washer on the back of the gas valve head 28⁴ comes into engagement with the cap 162, thereby both arresting the motion of the water actuated parts and sealing the stem opening in the cap 162 against any escape of gas. The seat ring 177 will follow the motion of the gas valve head—under the action of the spring 183—until the end of the screw 180 comes in contact with the thermostat lever 175, and the motion of the seat ring will then be arrested by the superior tension of the spring 184. If the temperature of the flowing water is less than that for which the thermostat mechanism is set to cut off the fuel supply—as determined by the adjustment of the screw 180—the motion of the seat ring will be arrested before it has followed the gas valve head to the extreme left hand position, and a port opening will be left between said seat and head through which fuel will flow from the gas inlet pipe F⁴ to the gas outlet pipe H⁴ which communicates with the main burners. The fuel thus supplied to these burners will be ignited by the usual pilot light, and the heat generated will immediately begin to raise the temperature of the flowing water, and this in turn will further expand the liquid in the thermostat tubes and thereby depress the knife edge on the diaphragm box 174. This will move the long arm of the thermostat to the left under the tension of the spring 184, and this in turn will allow the seat ring to be moved still further toward the gas valve head by the spring 183, until the gas valve port is ultimately closed thus shutting off the fuel supply to the heating burners. The temperature of the flowing water will then begin to fall and the resultant contraction of the liquid in the thermostat member will allow the long arm of the thermostat lever 175 to be moved to the right by the spring 184, and carry with it the seat ring 177 thus once more opening the main gas valve port and allowing a fresh supply of fuel to pass therethrough. The controlling action of the thermostatic mechanism on the fuel supply will continue as long as water continues to flow through the heater, but as soon as the supply of water is cut off, the pressure on the two sides of the diaphragm member will be equalized and the latter will be returned to its initial position by the spring 118⁴ thus closing the gas valve head against the seat ring 177 and carrying the latter out of the range of action of the thermostatic mechanism. In this construction there is very small chance of any of the parts sticking in their opened position, but if this should occur the diaphragm member 160 will be positively returned to its right hand position by the automatic closing of the check valve 89⁴ and the subsequent expansion of the then confined body of liquid in the heating receptacle. The closing of this check valve on the cessation of the flow also opens the ports 129⁴ and allows the water in the apparatus to circulate freely through the thermostat chamber and the heater coils, between the inlet and the outlet openings 3⁴ and 4⁴.

In the last described construction I have not made use of that feature of my invention which relates to the exposure of the negative and positive elements of the thermostat member to the action of the inflowing and of the outflowing streams of water, but it will now be obvious to those skilled in the art that in this case as in the others already described, the thermostat member and its surrounding parts could be so modified as to embody these features in my improvements whenever it is desired to do so.

As has already been indicated certain features of my improvements are also applicable in connection with storage tank heaters. In this case the water actuated element is not directly effected by the inflow or outflow of water to or from the apparatus, but is so constructed and arranged as to be affected only by the filling or emptying of the system. In order to effect this result it is not only necessary to subject one side of the water actuated member—that side which corresponds, in the instantaneous type of heater, to the inlet side—to the pressure of the water in the tank or some other connected part of the apparatus. The lower part of the apparatus shown in Fig. 13 could be directly applied to a storage tank heating system by turning it on its side, so that the thermostat tube would lie in a horizontal position, and cutting out the connections leading from the apparatus to the water main and house supply system, and also to the inlet and outlet of heater coils—in other words cutting out all of the pipes 1⁴, 122⁴, 5⁴, as well as the ports and chambers communicating therewith. In this use of the apparatus the thermostat tube would be inserted in a horizontal position in one end of the storage tank, and the port openings leading from the chamber 164 to the left hand end of the chamber 2⁴ blocked off, and the port 159 leading to the right hand end of said chamber led directly into the passage way 164. When so placed the right hand side of the diaphragm 160 would be exposed to the full water pressure in the apparatus, and, in consequence of this, the valve head 28⁴ would be held in the open position as long as the heater was filled with liquid. The thermostat mechanism would then operate to open and close the gas valve as the temperature of the liquid in the tank fell below or rose above the point for which the thermostatic cut off may be set to act. When the apparatus was emptied of water the diaphragm member 160 would be restored to the position shown in Fig. 13 by the spring 118⁴, thus carrying the valve head 28⁴, and the seat coöperating therewith, out of range of action of the thermostatic mechanism. This will prevent any fuel being admitted to the main burners of the heater when there was no liquid in the apparatus.

In Fig. 14 I have illustrated another construction of parts more especially designed for use in a storage tank heater. In this figure 190 indicates the head of the tank.
The frame of the apparatus is attached in any suitable manner to the head as by screwing or bolting it against a plate 191, which is riveted to said head. The lower part of this frame is bored to form a piston chamber 192, which opens directly into the tank, and contains a packed piston 193, which, when the apparatus is filled with liquid, is held tightly against the front shouldered end of the piston chamber. In this position leakage past the piston is prevented not only by the packing rings, but also by a leather-washer 194 which is interposed between the front end of the piston member 193 and the shoulder ring against which it is tightly pressed by the water pressure. The piston is provided with forwardly extending lugs, carrying at their front ends a pin which engages with the vertical arm of a bell crank lever 195, and the horizontal arm of this bell crank lever is engaged in turn with a pin carried by a downwardly extending lug on the lower head of the gas valve piston 26⁵, somewhat similar in construction to the one shown in Fig. 10. The upper end of this gas valve piston is formed with a seat with which the gas valve 28⁵ is adapted to engage, and it is provided with lateral ports 29⁵ which lead from the interior of the piston to an encircling chamber 30⁵ that communicates with the gas outlet pipe H⁵ lead- ing to the main burners of the heater. The gas is led into the upper part of the chamber containing the gas valve through the pipe F⁵ and the gas valve itself is carried by a leather diaphragm 178⁵. This diaphragm is clamped in position by means of a shallow recessed cap plate 196, and a small, port opening 197 leads from the gas chamber below the diaphragm to a space between this recessed cap plate and the top side of said diaphragm. This port opening is opened and closed by a poppet valve 198 carried on a stem which projects through a stuffing box in the cap plate 196 and terminates in a recessed head 199, the valve being held normally against its seat by means of a spring 200 interposed between said head and the said cap plate. A second port 201 leads from the space above the diaphragm to the exterior of the apparatus, this port being opened and closed by means of a valve 202 which is held against its seat by a spring 203. A thermostat member of the usual composite construction—comprising an outer positive tubular member 204 of copper, brass, or some highly expansible metal, and an inner negative member 205 of iron, steel, porcelain or similar material having a low coefficient of expansion—is secured to the frame of the apparatus and projects horizontally through the wall of the tank so as to be exposed for the greater part of its length to the liquid in said tank. The end of the inner negative member 205 terminates in a knife edge which bears against the short arm of the thermostat lever 206, the long arm of this thermostat lever carrying an adjustable screw 207 which is adapted to engage with the head 199. The long arm of this lever is also perforated to receive the stem 208 of the valve 201, and the upper end of this stem is threaded to receive an adjustable thumb nut 209 which is adapted to engage with the upper side of the thermostat lever 206. This lever is held in engagement with the knife edge, and causes it to follow the movements of the latter by means of the tension spring 210 which is considerably stronger than the spring 200.

The operation of the water actuated member in carrying the gas valve piston 26⁵ into and out of operative position is substantially the same as the operation of the corresponding parts in the mechanisms previously described. That is to say, when the apparatus is filled with liquid the pressure of said liquid on the back of the piston forces it forward, and depresses the gas valve piston 26⁵ to the position shown in the figure. But the operation of the thermostat control mechanism in opening and closing the gas valve in this position of the gas valve piston is somewhat different from any of the thermostatic control mechanisms already described in that the thermostat lever does not act directly on the gas valve head $28^5$, but acts only to control the relative pressures of gas on the two sides of the gas valve diaphragm $178^5$, and these differences in pressure so controlled are used to directly move the gas valve head, and thus turn on or turn off the fuel to the main burners of the heater. This is accomplished in the following manner: When the temperature of the water in the tank is less than that desired the long arm of the thermostat lever 206 is raised—by the pressure of the knife edge on the negative thermostat member 205—to such a height that the screw 207 is out of engagement with the head 199, and the valve 202 is raised from its seat by the engagement of the thermostat lever 206 with the thumb nut 209. When the valve 202, and the port 201 controlled thereby, is open the upper side of the diaphragm $178^5$ is subjected only to the pressure of the atmosphere, while the lower side of the said diaphragm is subjected to the pressure of the gas in the fuel supply pipe H. The diaphragm $178^5$ is made of such a size that the gas pressure on the lower side thereof is sufficient to raise the valve $28^5$ from its seat, thus allowing fuel to flow to the gas inlet pipe $H^5$ and thence on to the main burners, where it is ignited by the usual pilot light, constantly supplied with gas through an independent pipe not shown in the drawing. The gas valve will remain open and fuel will continue to flow past it until the temperature of the water in the tank has been raised to such a point that the expansion of the positive thermostat member 204 has retracted the knife edge on the negative member 205 sufficiently to allow the thermostat lever 206 to be depressed to such a position that the valve 202 will be closed by the pressure of the spring 203, and the valve 198 will be opened by the engagement of the screw 207 with the head 199. When this occurs gas will flow into the chamber above the diaphragm through the port 197, and both sides of the diaphragm $178^5$ being now subjected to the same pressure, the gas valve $28^5$ will be closed against its seat by gravity thus shutting off any further flow of fuel to the gas supply pipe I. As the temperature of the liquid in the tank falls—by reason either of gradual loss of heat by radiation or by reason of a withdrawal of hot water and consequent inflow of cold water—the thermostat member will contract thus lifting the long arm of the thermostat lever 206 until the valve 198 has closed and the valve 202 has opened again. When the last described action occurs the pressure on the top side of the diaphragm $178^5$ is once more relieved, and the main gas valve is again opened allowing a fresh supply of fuel to flow to the heater burners. It has been found in practice that a four-inch diaphragm is sufficiently large to operate the gas valve, and since the chamber above this diaphragm need be only of sufficient depth to allow for about a one-eighth inch movement of the gas valve in opening and closing, the volume of gas discharged through the port 201 at each opening movement of the main gas valve will be less than two cubic inches. In storage tank heaters the number of the opening and closing movements rarely exceeds one hundred in each twenty-four hours, and is as a rule much less than this. The total volume of gas discharged in the air is therefore less than one hundred cubic inches—only about one-twentieth of a cubic foot—in an entire day; and this is a quantity that is absolutely negligible and absolutely indistinguishable. It is in fact only about one-three-thousandth of the amount of gas which would be consumed by an ordinary gas burner in the same length of time, and it is in fact less than the amount that frequently escapes through an ordinary gas casing stuffing box. But if any objection exists to the discharge of this extremely small amount of gas into the open air such objection can be completely removed by discharging the gas into the chimney flue or into the casing of the heater coils, or into either the main outlet pipe $H^5$ or the pilot light tube in the manner described in my co-pending application of even date Ser. No. 744,198. As soon as the heating apparatus is filled with water the opening and closing movements of the main gas valve will continue as the temperature of the water in the tank falls below or rises above the points at which the thermostat may be set to act on the valves 198 and 202, these points being adjusted by means of the screw 207 and the thumb nut 209. But when the water is drawn entirely out of the heater the pressure on the piston 193 will be removed, and the gas valve piston $28^5$ will then be raised by the action of the compression spring 211, and will carry up with it the gas valve head $28^5$ until the upper side of the latter has been brought against the cap 196 thereby locking the gas valve port, no matter what may be the position of the thermostat control parts.

The advantage of using this pneumatic thermostatic control—in place of such controls as are illustrated for example, in connection with the constructions of Figs. 1 to 13—is that the main gas valve is either fully opened or entirely closed, and that these opening and closing movements take place with a "snap." This avoids the gradual closing off or the gradual letting on of the gas to the main burners when the temperature of the water in the tank is near that for which the control mechanism may be set to act. In storage tank heating systems such gradual turning on or off of the fuel supply is much more disadvantageous to the heaters of the so-called "instantaneous" type, because the change in the temperature of the liquid in the apparatus is much slower in the former than in the latter type and the movement of the thermostatic control parts, is for that reason, more sluggish in one case than in the other. It will however be now apparent to those skilled in the art that I may, if desired, use a pneumatic snap control—thermostatically operated—similar to that illustrated in Fig. 14 in place of the direct thermostatic controls illustrated in the constructions of Figs. 1 to 13. Such an application of a pneumatic snap thermostatic control to the instantaneous type of hot water heater is shown and described in my application Ser. No. 699,816.

In Fig. 15 I illustrate another form of construction—embodying certain features of my present improvements—also particularly designed for use in connection with a storage tank heating system. In this construction 190⁶ indicates the wall of the tank, the frame of the apparatus being secured thereto in the same manner as indicated in Fig. 14. In this case the water actuated member of the apparatus consists of a corrugated metal diaphragm 212 which is exposed on its right hand side to the direct pressure of the water in the tank. This pressure normally forces this member forward into the position shown in the figure against the pressure of the spring 213, bringing the gas valve piston 26⁶ and the main gas valve 28⁶ coöperating therewith into the position shown. The thermostatic control system which I use in this case is of the magnetic snap type more fully described and illustrated in my copending application Ser. No. 744,198. The thermostatic part itself is of the same type of construction as that shown in Fig. 14 and comprises an outer positive member 204⁶ and an inner negative member 205⁶, the latter terminating in a knife edge which bears against the short arm of a thermostat lever 206⁶. The long arm of said lever carries an adjustable screw 214 which bears in turn against the short arm of a second thermostat lever 215, the long arm of the latter carrying a horse shoe shaped electric magnet 216, the plane of which is at right angles to the sectional plane of the drawing. The poles of this electro magnet—one of which is behind, the other of which is in front of the plane of the drawing—are between two soft iron bar armatures 217 and 218 which are adjustably secured to the stem 219 of the main gas valve 28⁶. It is provided with two collars 219 and 220, one of which is adapted to directly engage the left hand side of the gas valve 28⁶, and the other of which engages the right hand side of said valve through the medium of a compression spring 221 interposed between the collar 220 and said gas valve. An anti-friction roller 222 may, if desired, be placed on the inner perforated head of the gas valve piston 26⁶ to support the right hand end of the stem 219. Adjustable stops 223 and 224 are secured to the thermostat lever 215 to limit the motion of said lever and the magnet 216 carried thereby in both directions; and compression springs 225 and 226 are arranged to act on the two thermostat levers 215 and 206⁶ respectively, the latter spring being strong enough to overcome the tension of the former when the two act against each other.

The operation of this thermostatic control mechanism is as follows: When the temperature of the water in the tank is above that for which the thermostat is set to act the retraction of the knife edge on the negative member 205⁶ allows the spring 226 to bring the screw 214 into engagement with the second thermostat lever 215 and move it and the magnet 216 to the right as far as the adjustable stop 224 will allow. The stop 224 and the armatures 217 and 218 are so adjusted that in this position the poles of the magnet 216 are nearer to the armature 218 than they are to the armature 217, and the superior attraction of said poles to the right hand armature will thereupon move the stem 219 and parts connected thereto the left thus pulling the gas valve 28⁶ against its seat and preventing any flow of fuel past said valve from the gas inlet pipe F⁶ to the gas outlet pipe H⁶. As the temperature of the water in the tank falls the contraction of the thermostat member will force down the thermostat lever 206⁶, withdraw the screw 214 out of engagement with the lever 215 and allow the latter to be moved to the left by the spring 225 until the stop 223 comes into engagement with its limiting boss. In this position of the lever 225 and the magnet 216 the poles of the latter are brought closer to the left hand armature 217 than they are to the right hand one, and the former armature will be moved toward the magnet poles carrying with it the stem 219 and the gas valve 28⁶ and thus open the main gas valve port and allow fuel to flow through it to the pipe H⁶ and thence onto the main burners of the heater where it will be ignited by the usual pilot light. The gas valve will remain open until the temperature of the liquid in the tank has been raised to such a point that the screw 214 is once more brought into engagement with the lever 215 and moves the latter to the initial position shown in the figure, whereupon the gas valve will be once more closed by the pull of the magnet poles on the nearer armature 218. Actual contact between the magnet poles and both the armatures 217 and 218 is prevented by means of thin brass or copper plates or pins of similar material secured to or in the end of the armatures or to or in the adjacent faces of the magnet poles. The above described opening and closing movements of the main gas valve will go on as the temperature falls below and rises above the points for which the thermostat may be set to act—as determined by the adjustment of the screw 214, the stops 223 and 224 and the armatures 217 and 218—as long as liquid remains in the tank. But as soon as all liquid has been withdrawn the diaphragm member 212 will be relieved of pressure and the spring 213 will thereupon move the diaphragm and the gas valve piston $26^6$ to the right, and this movement of the gas valve piston will carry with it the main gas valve $28^6$. This movement continues until the armature 217 is locked against the magnet frame thus preventing any further movement of the latter under the action of the thermostatically controlled parts, and thereby preventing any further opening of the main gas valve no matter what may be the position of the thermostatically controlled elements. All admission of fuel to the main burners of the heater is thus absolutely prevented when the apparatus is emptied of water and any danger of over-heating the parts by the accidental turning on of gas under such circumstances is thus prevented.

In Fig. 16 I illustrate a mechanism embodying the same general principles of construction and operation as characterizing the mechanisms already described. In this form of control apparatus a movable liquid seat is used in place of one of solid metal, the position of this liquid seat being determined by the action of an air or gas thermostat. In other words I substitute for one of the solid valve parts of the preceding structures a liquid valve part. This feature of construction presents certain novel advantages which will be made apparent hereafter.

In the construction of Fig. 16 the cold water from the main passes through a pipe $1^7$ to the lower end of a cylinder $2^7$ in which is located the water actuated member $6^7$. This water actuated member is a packed piston very similar in construction to that shown in Fig. 3. It has a central perforated boss $7^7$ which is coned exteriorly to fit loosely within a reversely coned boss or socket $8^7$ on the bottom head of the cylinder. A spring $47^7$ is interposed between the lower end of the boss $7^7$ and the upper cap of the cylinder $2^7$ and serves to hold the piston member $6^7$ normally in its lowest position in which the end of the boss $8^7$ bears against the lower side of the piston. A stem 229 is secured to the piston member $6^7$, passes down through a stuffing box in the lower cylinder head, and is secured at its upper end to a steel wire or cord 230. The other end of this wire is secured to a head 231 on the upper edge of a flat plate $26^7$ which is slidably mounted (as best seen in Fig. 17 which illustrates a modified structure but the same in so far as the valve $26^7$ is concerned) between the two parts of the gas valve box or casing G. This sliding plate forms with the adjacent walls of the gas valve box two rectangular chambers 232 and 233. The right hand chamber 232 communicates with the fuel inlet pipe $F^7$ by means of a port $29^7$ in the plate $26^7$; and the left hand chamber 233 communicates through a port 234 with the fuel outlet pipe $H^7$. The lower end of the chamber 232 communicates through a port 235 with another rectangular chamber 236, and hermetically secured in the upper wall of this chamber is an open ended tube 237. The lower part of both chambers 232 and 233, the chamber 236, and a portion of the tube 237 are filled with mercury in a manner presently to be described, so that in the normal inoperative condition of the control apparatus the said mercury forms a seal around the lower edge of the plate $26^7$ and rises in the tube 237 to the point $a$. When the main cut-off cock 238 is open and gas is admitted therethrough from the inlet pipe $F^7$ to the port opening $29^7$ and the right hand chamber 232, the mercury on the two sides of the plate $26^7$ will stand at a slightly different level as shown in the figure because of the liquid surface in the right hand chamber. A second tube 239 is hermetically secured in the upper wall of the chamber 236, this tube being closed at its upper end and forming, together with the inner tube 237—and the mercury column contained therein—a closed chamber which is filled with air or gas which is normally under less pressure than that which exists in the gas inlet pipe H; this difference in pressure being automatically maintained by the movements of the mercury column in the inner tube. A third tube 240 is secured at its lower end into the upper wall of the chamber 236 and is secured at its upper end to the lower head of the water cylinder $2^7$. The hot water outlet $4^7$ which leads from the lower reverse coil C of the heater enters the lower end of the cylindrical annular chamber between the tubes 239 and 240, passes upward through this chamber and out at the top through a passage way 241 to the house service pipe $5^7$. A hollow tube 242 is secured to the piston member $6^7$ and passes down through a circular perforation in the lower head of the cylinder $2^7$, and, when the piston is in its lowest position, bears against a puppet valve $9^7$ mounted in an arm 243. The lower end of the tube 242 is provided with notches, and when the puppet valve is held away from its seat by the pressure of this tube on its top face water can flow from the upper end of the thermostat chamber through this hollow tube to the space above the piston and thence through the cold water inlet 3⁷ to the heater coils. This arrangement provides for a free circulation of the liquid through the heating receptacle and the thermostat chamber when no water is flowing and thereby insures equality in temperature of the water in all parts of the apparatus.

In the initial setting up and adjustment of the mechanism above described the solid parts of the control apparatus are first assembled in the position shown in Fig. 16 and the apparatus is filled with water. This water is next raised to a temperature a little less than that at which it is desired that the thermostatic control mechanism shall shut off the gas. This heating can be accomplished by the use of an independent auxiliary burner temporarily placed under the heater in which case the heater need not be connected up to the water main—but it is preferably accomplished by the use of the regular main burners of the heater itself, in which case the heater is connected up in the regular way to the water main and house service pipes. After this has been done the plug 244 is removed and a small amount of mercury—sufficient to fill the chamber 236 to about one-half its depth—is introduced through this opening. The pilot light—which is supplied with gas through the tube 245—is next lighted and a flow of water is then started through the heater by opening an outlet connected to the pipe 5⁷. This flow of water lifts the piston member 6⁷ against the pressure of its restraining spring 47⁷, and this upward movement of the piston member allows the puppet valve 9⁷ to seat itself (thereby cutting off any further flow of water from the thermostat chamber to the upper side of said piston) and also lifts the valve plate 26⁷ against the pressure of the spring 246. This upward movement of the piston member 6⁷ and the gas valve plate 26⁷ continues until the head 231 of the valve plate has come into engagement with the lower end of the adjustable stud 247. This stud is so adjusted in position that when the valve plate is in its upper position its lower edge is about level with the top of the chamber 236. The main cut off gas valve 238 (which up to this time has been closed) is next opened, admitting gas from the fuel inlet pipe H to the right hand chamber 232 of the gas valve box G⁷. As the lower edge of the valve plate 26⁷ is now above the level of the mercury in the apparatus the gas will flow around the lower edge of this plate into the left hand chamber 233, thence out through the passage way 234 and on through the fuel outlet pipe H⁷ to the main burners of the heater where it is ignited by the flame of the pilot light. As soon as the water flowing through the apparatus has reached the desired temperature—as indicated by a thermometer inserted at any convenient point in the out-flowing stream—an additional amount of mercury just sufficient to fill the chamber 236 is poured in through the port opening and the plug 244 is screwed in. This operation raises the level of the mercury in the chambers 232 and 233 even with the lower edge of the valve plate 26⁷. The pressure in the now closed air chamber inside of the closed pipe 239 is now the same as the pressure of the gas in the fuel inlet pipe F⁷, and the control mechanism is in proper adjustment for effecting the desired thermostatic cut off of the gas supply. This cut-off is effected on any further rise in temperature of the flowing water by the resultant increase in pressure in the chamber of the air thermostat; this increased pressure depressing the mercury in the chamber 236 and correspondingly raising it in the chambers 232 and 233 so that it forms a seal around the lower edge of the valve plate 26⁷ and prevents any further flow of fuel through the gas outlet pipe I. The area of the chamber 236 is made substantially equal to the combined area of the chambers 232 and 233 so that the downward movement of the mercury in the first chamber is substantially equal to the upward movement of the mercury in the other two chambers. This makes the fuel control very sensitive and causes the flow of gas to the main burners to be cut off very sharply with a very small increase in temperature in the flowing water. When the temperature falls again the pressure on the mercury in the chamber 232 is reduced by the resultant contraction of the air in the closed thermostat tube 239, the mercury in the chamber 236 rises and that in the chambers 232 and 233 falls thereby breaking the liquid seal around the lower edge of the valve plate 26⁷ and allowing a fresh supply of fuel to pass to the gas outlet pipe K. These alternate oscillations of the mercury level in the chambers 232, 233 and 236 will continue as the temperature of the flowing water rises above and falls below the point of thermostatic cut-off and will, as already explained, result in successively shutting off and turning on the fuel supply to the main burners of the heater as long as water continues to flow through the apparatus. When the flow of water is shut off the piston member 6⁷ will be returned to its lowest position by the spring 47⁷, and this will allow the gas valve plate 26⁷ to be likewise returned to its lowest position—as shown in the figure— by the spring 246. As the temperature of the water and of the air in the thermostat tube 239 falls the mercury will be correspondingly depressed in the chambers 232 and 233 and raised in the tube 237. But the area of this tube 237 is so small—in this particular construction illustrated it is about 1/30th of the joint area of the chambers 232 and 233—that a very large upward movement of the mercury in the tube (corresponding to a change of temperature of 120 degrees or more of the water in the thermostat chamber) results in only a very small downward movement of the mercury in the chambers 232 and 233 so that the mercury seal around the lower edge of the gas valve plate 26⁷ is always preserved when said plate is in its lowest position.

As already explained the quantity of mercury in the apparatus is so adjusted that at the point of thermostatic cut-off the mercury is all out of the tube 237 and is contained only in the chambers 236, 232 and 233. Variations in the exact point of thermostatic cut-off can be effected by an independent or joint adjustment of the stud stop 247 and the plug 244, and also, if necessary, by the further adjustment of the plug 248 in the lower wall of the chamber 236. This last plug also serves as a means for withdrawing the mercury from the apparatus when the heater is to be moved or shipped. To avoid any loss of mercury by vaporization in the tube 237 I may place in that tube a small plug of fusible metal which will melt at a temperature less than the point of thermostatic cut-off and which—being of less density than the mercury—will float on the top surface of the same while the control apparatus is in operation. Instead of using fusible metal to form a protecting film on the top of the mercury I may use paraffin or some other non-volatile heavy oil. If either of these latter materials is used a sufficient quantity can be placed above the mercury to always cover the lower end of the tube 237 since the specific gravity of such material is so small as compared with mercury that the pressure of even a considerable head of such material in the tube 237 is without sensible effect on the movements of the mercury surfaces in the lower chambers.

In Fig. 17 I have illustrated a modification of the construction of Fig. 16 said modification being particularly designed for the use of fusible metal alone. In the control mechanism of Fig. 17 all of the parts are substantially of the same form as in the previously described construction save that the chamber 232 is provided at the side next to the heater shell with a lateral branch 250 which passes through the side of the heater shell 251 and terminates in a hollow head 252 just over the flame of a pilot light P. The chambers 236, 233 and 232—together with the branch 250 and hollow head 252—are filled with melted fusible metal in the same manner as the corresponding chambers of the preceding construction are filled with mercury. The fusible metal in the chambers 232 and 233 is kept in a liquid condition when the apparatus is in use by the heat of the pilot light P even though the water in the thermostat chamber may get so cold that the fusible metal in the tube 237 and the upper part of the chamber 236 may become solidified. The apparatus is thus always in a condition for use, because the fusible metal in the valve plate chamber being liquid, said valve plate can be raised at any time by the lifting of the water actuated piston member 6⁷ when the water starts to flow through the heater coils. This lifting of the valve plate admits fuel to the main burners and before the water flowing through the apparatus becomes heated to near the point of thermostatic cut-off the whole mass of fusible metal will have been liquefied by the heat of the water in the thermostat chamber. The control apparatus will then operate in exactly the same way as though it were filled with mercury. When fusible metal is used the variation in the height of the liquid column in the tube 237 will be somewhat greater than it is with mercury because the specific gravity of fusible metal is somewhat less, but this is no disadvantage, in fact, it is in some respects an advantage. The use of fusible metal has a further advantage in that it affords a means for locking the gas valve against opening in case the pilot light should be for any reason extinguished. In such case the fusible metal will solidify in the chambers 232 and 233, and as such metal expands during solidification it will hermetically seal the opening around the lower edge of the gas valve plate or piston until the pilot light is once more lighted and the fusible metal remelted. To aid this seating and locking action of the solidified fusible metal the lower edge of the gas valve plate 26⁷ can, if desired, be slightly flared or made wedge shape, and the adjacent walls of the chambers 232 and 233 may be reversely tapered so that the parts are locked in position against any opening pressure that can be brought to bear by the water actuated piston member 6⁷. Under such circumstances the locking of the parts of the control mechanism will not only prevent any flow of gas to the main burners, but will prevent any flow of water through the heater coils.

In Fig. 18 I illustrate another construction quite similar in its general structural character and mode of operation to that of the apparatus shown in Figs. 16 and 17. In the apparatus of Fig. 18 the cold water from the main flows directly into an inlet (not shown in this figure) at the top of the heater coils. After passing through these coils in the order already described the water enters a thermostat chamber 255 which, in this case, is arranged in a horizontal position across the heater shell. Inside of this hot water thermostat chamber a tube $239^8$ which is closed at its inner end (like the tube 239 of Fig. 16) and is brazed at its outer end into the inner head 256 of the casting 257 which not only supports the outer tube $240^8$ of the thermostat chamber 255, but also contains the water actuated valve member $6^8$. The wall which supports the inner head 256 in place in the casting 257 is perforated to allow the water to pass from the chamber 255 around the head 256 to the lower side of the valve $6^8$, and a pipe $5^8$ leads from the space above this valve to the house supply system or other desired point of discharge. A small pipe $237^8$ is brazed into the lower integral wall of the casting 257 and the inner head 256 and is preferably prolonged upwardly through that wall into a vertical extension of the inner thermostat chamber $239^8$; this vertical extension of said chamber being likewise closed at the top, and preferably surrounded by a similar upward extension of the hot water thermostate chamber 255. The tube $237^8$ is open at the top and is hermetically connected at the bottom to a chamber $236^8$ in the lower part of the gas valve casing $G^8$. The movable gas valve head $26^8$ consists in this case of a thin copper or brass tube closed at the top by a circular head and mounted on a stem 260 which slides vertically in a stuffing box in the top cap or head 258 of the gas valve casing. Secured to the upper end of this stem is a head $231^8$ which is connected to a small wire stem or rod $230^8$ that leads upward through a stuffing box in the lower head of the chamber 257 and is secured to the water actuated valve member $6^8$. A spring $246^8$ is interposed between the head $231^8$ and an angle support 259 that is bolted to the cap 258. This spring serves to keep both the water valve member $6^8$ and the gas valve plunger $26^8$ in their lowest positions as shown in the figure. An adjustable stud stop $247^8$ is threaded through the upper head of the angle support 259 for the purpose of limiting the upward motion of the valve members $6^8$ and $26^8$. The lower head of the gas valve casing $G^8$ is also provided with an upwardly extending annular wall concentric with the tubular part of the gas valve plunger $26^8$. The space between this wall and said tubular part constitutes a second annular chamber $233^8$, and the lower part of the chambers $232^8$ and $233^8$ and the chamber $236^8$ are filled with mercury or fusible metal in the same manner as previously described in connection with the construction of Fig. 16; this mercury being poured in through the opening closed by an adjustable screw plug $244^8$.

The operation of this control mechanism is substantially the same as that of the mechanism shown in Figs. 16 and 17. When no water is flowing through the apparatus the valve parts $6^8$ and $26^8$ are held in their lowest positions by the spring $246^8$, and the lower end of the latter valve member is covered by the mercury seal which prevents any flow of gas from the fuel inlet pipe $F^8$ to the fuel outlet pipe $H^8$. When a flow of water is started through the apparatus as by opening an outlet connected to the pipe $5^8$ the water actuated valve member $6^8$ is raised lifting the gas valve plunger $26^8$ until the head $231^8$ comes into contact with the lower end of the stud stop $247^8$. In this position of the parts the lower end of the gas valve plunger is above the level of the mercury in the chambers $232^8$ and $233^8$, and gas flows around the lower end of the gas valve plunger to the gas outlet pipe $H^8$ and thence on to the main burners of the heater where it is ignited by the usual pilot light provided for that purpose. As the temperature of the flowing water rises the air or gas in the closed inner thermostat tube $239^8$ is correspondingly heated and its pressure increases thereby depressing the level of the mercury column in the tube $237^8$ and raising the level of the mercury in the chambers $232^8$ and $233^8$. The amount of mercury in the apparatus and the volume of the tube $237^8$ and of the chambers $232^8$ and $233^8$ is proportioned as previously described so that when the level of the mercury in the tube $237^8$ has fallen to the top line of the chamber $236^8$ the level of said mercury in the chambers $232^8$ and $233^8$ has risen to the lower edge of the elevated plunger $26^8$. The cross-sectional area of the chamber $236^8$ is preferably made substantially equal to the combined cross-sectional area of the two chambers $232^8$ and $233^8$ so that, after the mercury has fallen below the level of the lower end of the tube $237^8$ the further downward movement of the mercury in the chamber $236^8$ results in a substantially equal upward movement in the chambers $232^8$ and $233^8$. This effects a rapid cut off and equally rapid turning on of the gas (by the sealing and unsealing of the mercury joint around the lower end of the gas plunger $26^8$) for a very small change in temperature of the air or gas in the inner thermostat chamber $219^8$. This sealing and unsealing of the gas valve port—and consequent shutting off and turning on of the gas supply to the main burners of the heater—continues as long as water continues to flow through the heater and successively rises above and falls below the point of desired thermostatic cut-off; this point being varied as before by the joint or independent adjustment of the stud stop $247^8$ and of the plugs $244^8$ and $248^8$. But when the flow of water through the heater is stopped the valve members $6^8$ and $26^8$ are immediately returned to their lowest positions by the action of the spring 246⁸ and in this position the lower end of the latter valve member is always covered by the mercury seal no matter what may be the temperature in the thermostat chambers.

As before I may use a small amount of fusible metal or of some thick non-volatile oil or liquid to cover the top of the mercury in the tube 237⁸ and thereby prevent any loss of mercury by volatilization. In place of mercury I may also use fusible metal alone to fill not only the tube 237⁸ but also the chambers 232⁸, 233⁸ and 236⁸, the latter chamber being provided in this case with a branch extension 250⁸ (indicated by dotted lines in Fig. 18) which leads in through the heater shell 251⁸ and terminates in a hollow head located just above the flame of the pilot light. In such case the fusible metal can be kept liquid by the heat of the pilot light and acts to seal and unseal the gas valve port opening as the temperature in the thermostat chamber rises above and falls below the point of desired thermostatic cut-off; and it also acts—as previously explained in connection with the construction shown in Fig. 17—as a safety seal to lock the parts against movement when the pilot light becomes extinguished and the fusible metal solidifies in the chambers 232⁸, 233⁸ and 236⁸.

Having thus described my invention and illustrated its use, what I claim as new and desire to secure by Letters Patent, is the following:

1. In a water heater, a burner, a pair of relatively movable coöperating valve parts for controlling the passage of gas therebetween to the burner, with one of the said parts acting as the seat for the other part, a member actuated by the differences of water pressure caused by opening and closing the outlet from the heater, a thermostatic means operated by the heater water, a connection from the said member to one of the valve parts whereby such valve part is moved to position to permit the passage of gas to the burner when the outlet from the heater is opened, and a connection from the thermostatic means to the other valve part whereby such other valve part is caused to move to a position to cut off the flow of the gas to the burner when the temperature of the heater water rises above a predetermined point.

2. In a water heater, a burner a pair of relatively movable coöperating parts one of which comprises a valve and the other the seal or seat for such valve for controlling the passage of gas therebetween to the burner, a member actuated by the differences of water pressure caused by opening and closing the outlet from the heater for securing the actuation of one of the said valve parts, and a thermostatic means operated by the heater water for governing the movement of the other valve part.

3. In a water heater, a burner a pair of relatively movable coöperating valve parts one of which is the seal for engaging the other part for controlling the passage of gas therebetween to the burner, a member actuated by the differences of water pressure caused by opening and closing the outlet from the heater for securing the movement of one of the said valve parts to permit the passage of gas between the valve parts when the outlet from the heater is opened and the temperature of the heater water below a predetermined point, and a thermostatic means operated by the heater water for causing the other valve part to close with respect to the first valve part when the temperature of the heater water rises above a predetermined point for which the thermostatic means is set.

4. In a water heater, a burner, a gas valve for controlling the flow of gas to the burner, and a thermostat for operating the gas valve and controlled by the heater water, the said thermostat being compound and having one of its elements exposed to the inflowing water and the other element exposed to the outflowing water.

5. In a water heater, a burner, a gas valve for controlling the flow of gas to the burner, and a thermostat for operating the gas valve and controlled by the heater water, the said thermostat being compound and having one of its elements exposed to the inflowing water and the other element exposed to the outflowing water with said parts of the thermostat so arranged that the contraction of the part exposed to the relatively cool inflowing water tends to secure the movement of the gas valve in the same direction as does the expansion of the part exposed to the relatively hot outflowing water.

6. In a water heater, a burner, a pair of relatively movable coöperating valve parts one of which is the seat for the other for controlling the passage of gas therebetween to the burner, a member actuated by changes of water pressure in the heater for securing the actuation of one of the said valve parts, and a thermostatic means operated by the heater water for governing the movement of the other valve part.

7. In a water heater, a burner, a conduit for conducting a supply of gas to the burner, a pair of relatively movable coöperating valve elements located in the conduit between which the gas must pass on its way to the burner, one of such elements constituting the valve and the other the coacting seal or seat therefor, means actuated by changes of water pressure in the heater for securing the actuation of one of said valve elements, and a thermostatic means operated by the heater water for governing the movement of the other valve element.

8. In a heating system, a burner, a pair of relatively movable coöperating valve parts for controlling the passage of fuel therebetween, one of such parts constituting the valve and the other the seal therefor with which the valve engages in such way as to cut off the supply of gas when the parts are in one position, a member actuated by the differences of fluid pressure in the system for securing the actuation of one of the said valve parts, and a thermostatic means operated by the heat of the system for governing the movement of the other valve part.

In testimony whereof I have hereunto signed my name in the presence of the two subscribed witnesses.

FRANK L. O. WADSWORTH.

Witnesses:
LETITIA A. MYERS,
ARCHWORTH MARTIN.